United States Patent [19]

Hart

[11] Patent Number: 5,256,305
[45] Date of Patent: Oct. 26, 1993

[54] METHOD FOR BREAKING EMULSIONS IN A CRUDE OIL DESALTING SYSTEM

[75] Inventor: Paul R. Hart, The Woodlands, Tex.

[73] Assignee: Betz Laboratories, Inc., Trevose, Pa.

[21] Appl. No.: 934,837

[22] Filed: Aug. 24, 1992

[51] Int. Cl.⁵ .............................................. B01D 17/04
[52] U.S. Cl. ................................ 210/708; 208/251 R;
208/311; 210/732; 210/737; 252/331; 252/358
[58] Field of Search ............... 208/251 R, 252, 311,
208/282; 210/708, 725, 727, 728, 729, 732, 749, 737; 252/331, 358

[56] References Cited

U.S. PATENT DOCUMENTS

| | | | |
|---|---|---|---|
| 4,175,054 | 11/1979 | Tait et al. | 252/358 |
| 4,947,885 | 8/1990 | Hart | 210/708 |
| 5,080,779 | 1/1992 | Awbrey et al. | 208/252 |

Primary Examiner—Peter Hruskoci
Attorney, Agent, or Firm—Alexander D. Ricci; Steven D. Boyd

[57] ABSTRACT

Method of breaking the desalter emulsion in a crude oil desalting system in which oil based demulsifiers are added to the wash water stream and mixed prior to contacting the crude oil. The method is effective for crude oils which form reverse (oil-in-water) emulsions when mixed with the wash water at the process temperature.

3 Claims, 5 Drawing Sheets

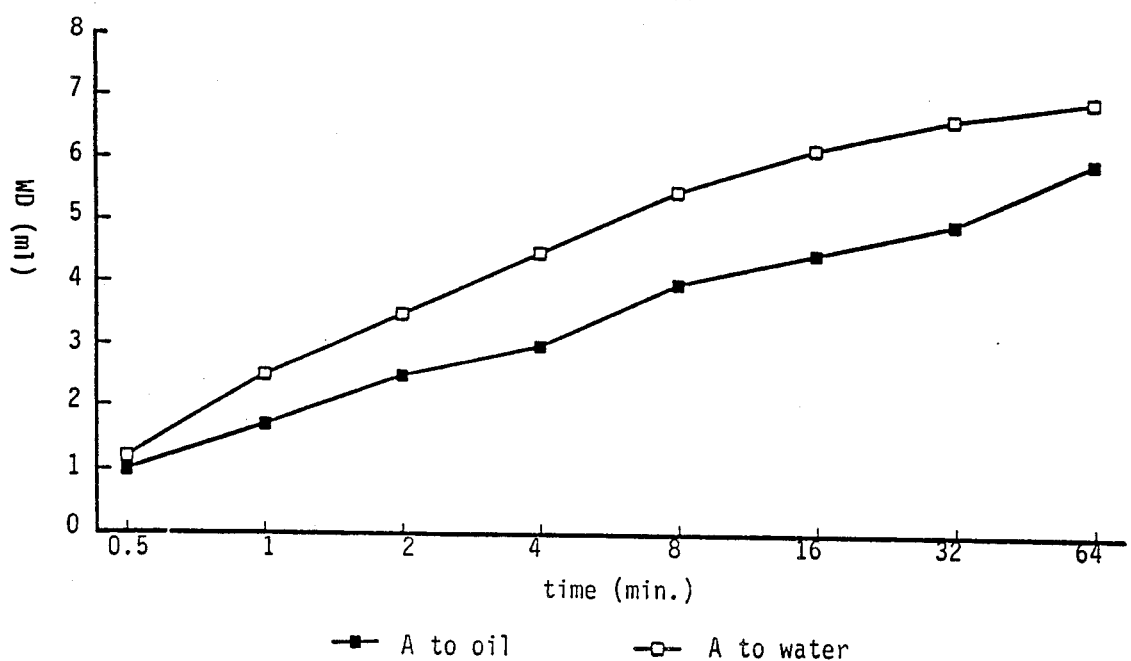
Figure 1  6 ppm
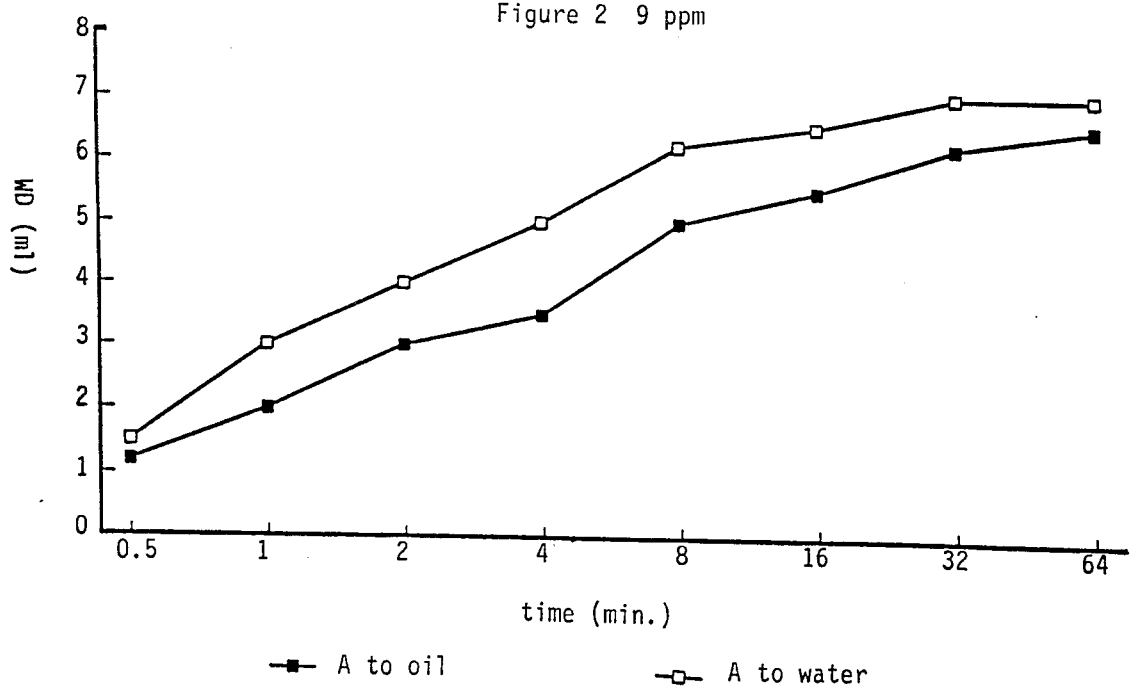
Figure 2  9 ppm

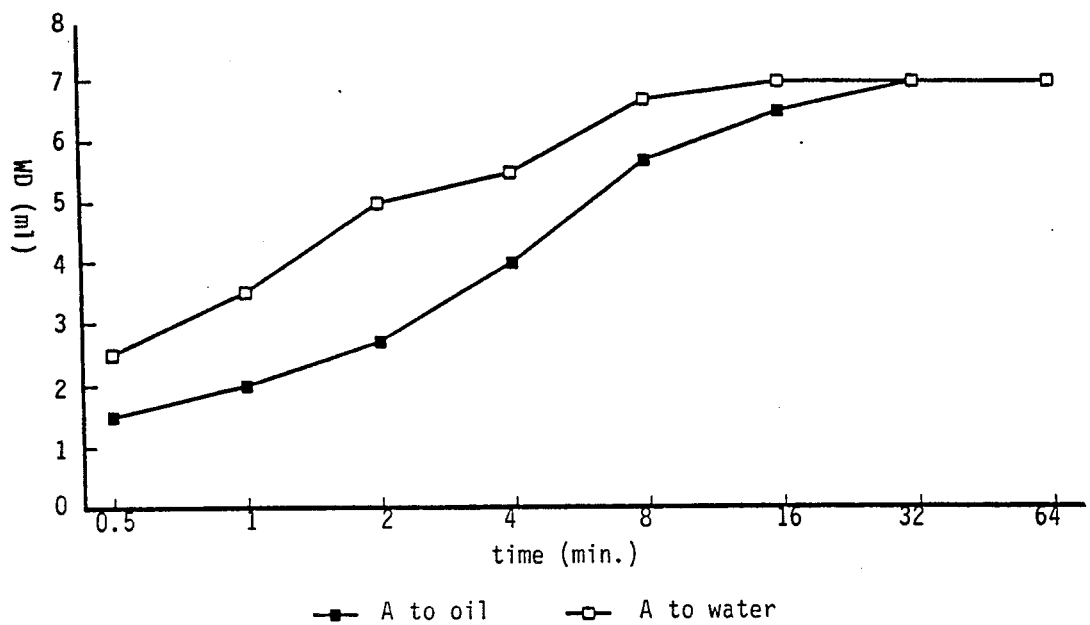
Figure 3  12 ppm
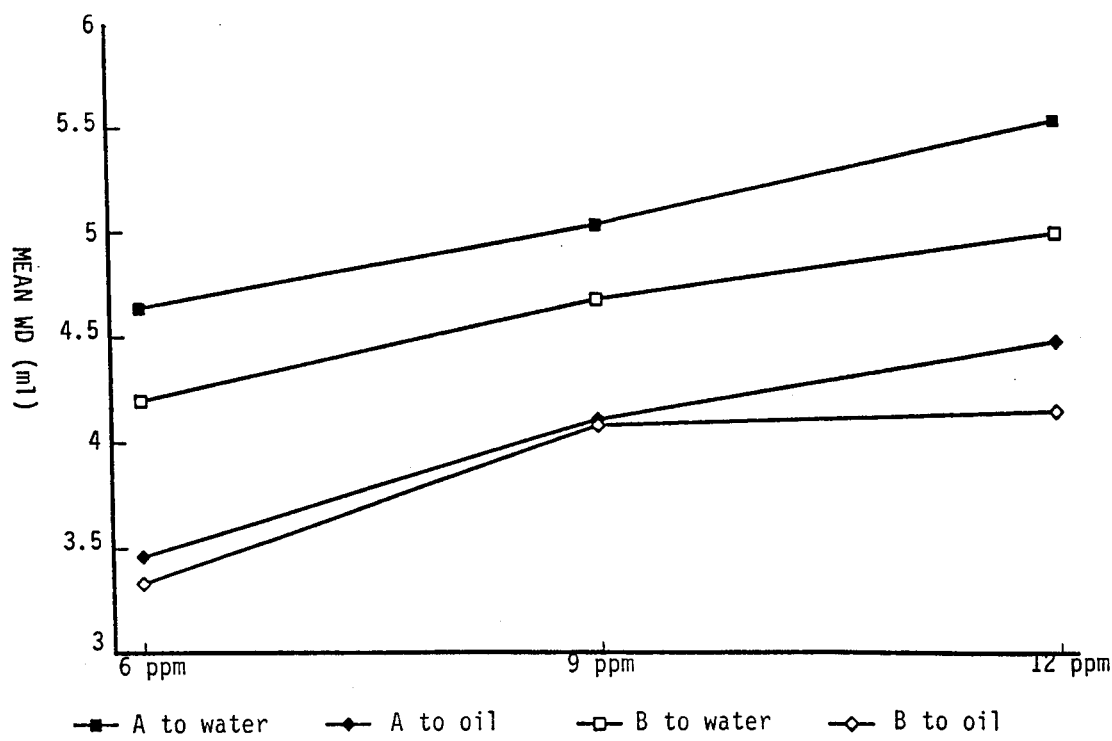
Figure 4

METHOD FOR BREAKING EMULSIONS IN A CRUDE OIL DESALTING SYSTEM

FIELD OF THE INVENTION

The present invention relates to a process of breaking emulsions in a crude oil desalting system. More particularly, the present invention relates to an improved method of breaking the desalter emulsions wherein oil based demulsifiers are added to the wash water in a crude oil desalting system.

BACKGROUND OF THE INVENTION

All crude oil contains impurities which contribute to corrosion, heat exchanger fouling, furnace coking, catalyst deactivation and product degradation in refinery and other processes. These contaminants are broadly classified as salts, bottom sediment and water, solids, and metals. The amounts of these impurities vary depending upon the particular crude. Generally, crude oil salt content ranges between about 3 and 200 pounds per 1000 barrels.

Brines present in crude include predominantly sodium chloride with lesser amounts of magnesium chloride and calcium chloride being present. Chloride salts are the source of highly corrosive HCL which is severely damaging to refinery tower trays, and other equipment. Additionally, carbonate and sulfate salts may be present in the crude in sufficient quantities to promote crude preheat exchanger scaling.

Desalting is, as the name implies, adapted to remove primarily inorganic salts from the crude prior to refining. The desalting step is provided by adding and mixing with the crude a few volume percentages of fresh water to contact the brine and salts present in the crude.

In crude oil desalting, a water-in-oil emulsion is intentionally formed with the water admitted being on the order of about 4 to 10 volume percent based upon the crude oil. Water is added to the crude and mixed intimately to transfer impurities in the crude to the water phase. Separation of the phases occurs due to coalescence of small water droplets into progressively larger droplets and eventually gravity separation of the oil and an underlying water phase occurs.

Demulsification agents are added, usually upstream from the desalter, to help in providing maximum mixing of the oil and water phases in the desalter. Known demulsifying agents include water soluble salts, Twitchell reagents, sulfonated glycerides, sulfonated oils, acetylated castor oils, ethoxylated phenol formaldehyde resins, a variety of polyester materials and many other commercially available compounds.

Desalters are also commonly provided with electrodes to impart an electrical field in the desalter. This serves to polarize the dispersed water molecules. The so formed dipole molecules exert an attractive force between oppositely charged poles with the increased attractive force increasing the speed of water droplet coalescence by from 10 to 100 fold. The water droplets also move quickly in the electrical field, thus promoting random collisions that further enhance coalescence.

Upon separation of the phases from the water-in-oil emulsion, the crude is commonly drawn off the top of the desalter and sent to the fractionator tower in crude units or other refinery processes. The water phase containing water soluble metal salt compounds and the sediment is discharged as effluent.

Emulsion breakers, also called demulsifiers, are usually fed to the crude so as to modify the stabilizer film formed initially at the oil/water interface. These emulsion breakers are surfactants that migrate to the interface allowing droplets of water (or oil) to coalesce more readily. The demulsifiers reduce residence time required for good separation of oil and water.

SUMMARY OF THE INVENTION

The present inventor has found that contrary to conventional wisdom, addition of an oil based demulsifier directly to the wash water followed by mixing of the demulsifier with wash water prior to addition to the crude oil increases the water removal capability of the demulsifier. The process of the present invention is effective for the treatment of desalter crude feeds which form reverse (oil-in-water) emulsions when mixed with the demulsifier at process temperatures in a test tube.

DESCRIPTION OF THE DRAWINGS

FIG. 1 is a line graph of water drop versus time.
FIG. 2 is a line graph of water drop versus time.
FIG. 3 is a line graph of water drop versus time.
FIG. 4 is a line graph of mean water drop versus treatment rate.

DESCRIPTION OF THE PREFERRED EMBODIMENTS

Figure 5:
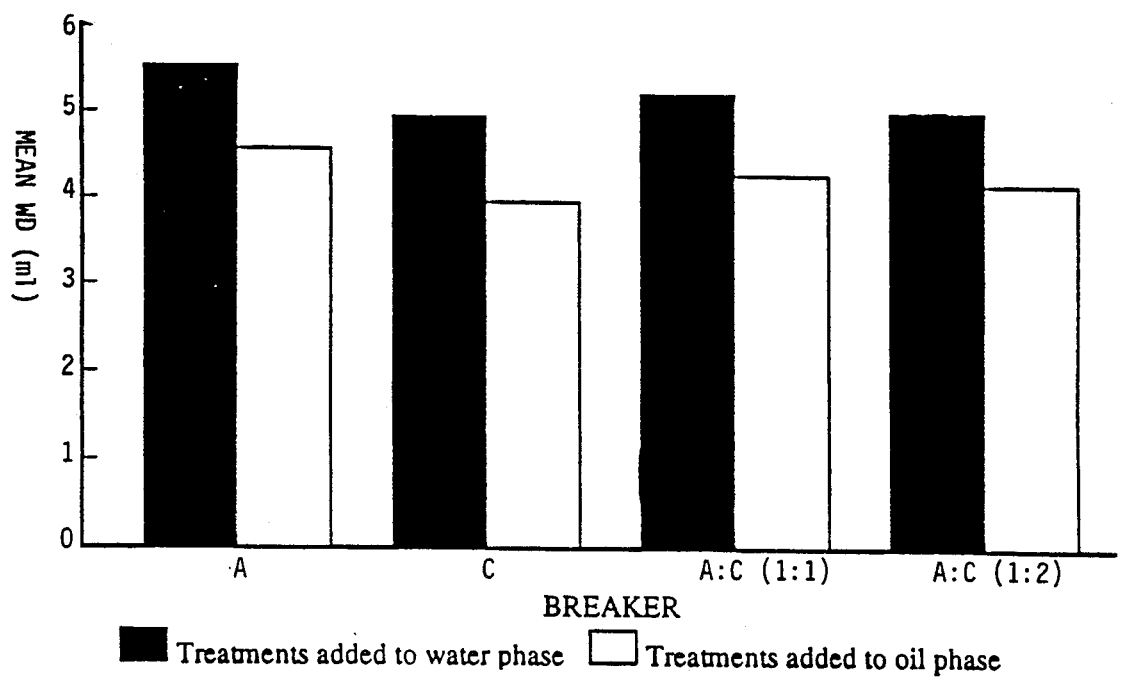
FIG. 5 is a bar graph of mean water drop versus addition point for Emulsion 1.

The process of the present invention provides for the improved separation of water from oil in an oil refinery desalter. The desalter may be any of the types commonly encountered in the refinery industry. The specific construction details of the desalter are not important to the present invention. However, it is noted that ordinarily, desalters are provided with electrodes to impart an electric current through the emulsion to aid in coalescence of the water droplets to facilitate resolution of the emulsion. Also, desalters are provided with heat imparting means and pressure control means to respectively control temperature and pressure within the vessel.

Typically, desalter temperatures are maintained at from 90° to 150° C. Heat lowers the viscosity of the continuous phase (the oil phase) thereby speeding the settlement of the coalesced water droplets as governed by Stokes Law. It also increases the ability of the bulk oil to dissolve certain organic emulsion stabilizers that may have been added or are naturally occurring in the crude oil.

Desalter pressure is kept high enough to prevent crude oil or water vaporization. Desalter pressures at operating temperatures should be about 20 psi above the crude oil or water vapor pressure, whichever is higher.

While emulsion breakers, also called demulsifiers, are usually added to the crude so as to modify the stabilizer film formed initially at the oil/water interface, in the present invention oil based demulsifiers are added directly to the wash water and allowed to mix prior to contact with the crude oil. Typical oil based demulsifiers employed in crude oil desalting include alkylphenol, alkylamine, alkylol, and polyol alkoxylates with or without cross-linking with aldehydes, di- or multi-functional acids, epoxides, isocyanates and the like. Alkyl groups can include; t-butyl, t-amyl, di-t-butyl, triisopropyl, tetra isopropyl and naturally occurring C12-C22 alkyls. Polyors can include; various diols, triols, tetrols and sorbitols. Alkoxylates can include soly-(ethylene oxide), soly-(propylene oxide), poly(butylene oxide) and the like together or in blocks.

The inventor of the present invention discovered that for crude oils which form a reverse (oil-in-water) emulsion when mixed with water at process temperatures, the addition of the demulsifier to the washwater prior to mixing with the crude unexpectedly increased the separation of water from oil. The demulsifier can be added in amounts of from 1-200 ppm of demulsifier based on crude oil and is preferably added in from about 5 to 25 ppm of demulsifier based on crude oil. For crude oils which do not form a reverse emulsion when mixed at process temperature the prior method of adding the demulsifier to the crude oil was more effective.

EXAMPLES

In order to assess the efficacy of the demulsification method of the present invention, separation tests were conducted on crude oils in a simulated desalter apparatus. The simulated desalter comprises an oil bath reservoir provided with a plurality of test cell tubes disposed therein. The temperature of the oil bath can be varied to about 150° C. to simulate actual field conditions. The test cells are inserted into a perforated plate capacitor to impart an electric field of variable potential through the test emulsions contained in the test cell tubes.

Crude oil, about 93% (volume) and water about 7% (volume) were admitted to each test cell along with the candidate demulsifier material. Tests were run in which the demulsifier materials were added via the crude oil and via the washwater. The crude/-water mixtures were heated to 120° C. then homogenized by a blending assembly built into the cap of each test cell. The crude/-water mixtures were observed to determine whether oil-in-water or water-in-oil emulsions were formed. It is important to note that the conventional method of testing demulsifiers in which the emulsion is made than heated does not reliably produce the reverse (oil-in-water) emulsions needed to predict the proper phase of addition in accordance with the present invention.

A predetermined electrical voltage was applied to the cells by inserting them into an electrode. The cells were then permitted to remain in the oil bath for up to an hour. The water drop (i.e. water level), in milliliters, in each test cell was observed over time and recorded at increasing intervals as shown in FIGS. 1, 2, and 3.

These readings were averaged and the Mean water drop (WD) taken as the best measure of a breakers' ability to break out water. The mean WD as a function of dosage and addition point is shown in FIG. 4.

A variety of crude oil feeds were tested and it was found that the improvement of the present invention was significant only for those crude oils which formed a reverse (oil-in-water) emulsions when mixed with the demulsifier at process temperatures in the test cells. Table 1 summarizes the properties of the tested crude oils and wash waters. FIGS. 5-10 summarize the results of testing of various desalter feeds which do or do not form reverse oil-in-water emulsions as noted. The demulsifiers tested are described in Table 2.

TABLE 1

| | | Properties of Crude Oil | | | | |
|---|---|---|---|---|---|---|
| Emulsion Reference | Region Processed | API Gravity of Crude Oil | Water & Sedmt in Crude Oil (%) | pH of Wash-Water | Reverse Emulsion Formed in Hot Mixing | Better Addition Point For Breaker |
| 1. | East Texas | 42 | 0.1 | 7.3 | Yes | Water |
| 2. | Midwest US | 36 | 0.1 | 11.7 | No | Oil |
| 3. | Midwest US | 35 | 1.3 | 11.7 | Yes | Water |
| 4. | South Texas | 35 | 1.3 | 9.4 | Yes | Water |
| 5. | California | 19 | 1.0 | 9.1 | No | Oil |

TABLE 2

| Demulsifier | Description |
|---|---|
| A | Oil-based acid catalyzed butyl phenol-formaldehyde resin ethoxylate |
| B | Oil-based, acid-catalyzed blend of butyl and nonyl phenolic resin ethoxylates |
| C | Oil-based, acid catalyzed nonyl phenol-formaldehyde resin ethoxylate |
| D | Oil-based blend of acid and base catalyzed nonylphenolic resins and polypropylene oxide ethoxylates |
| E | Oil-based polypropylene oxide ethoxylate |
| F | Oil-based quaternary alkyl amine ethoxylate |
| G | Oil-based, acid-catalyzed blend of nonylphenolic resin and polypropylene oxide ethoxylates |
| H | Water-based cationic/amphoteric acrylic terpolymer |
| I | Water-based quaternary alkylamine ethoxylate |

Figure 6:
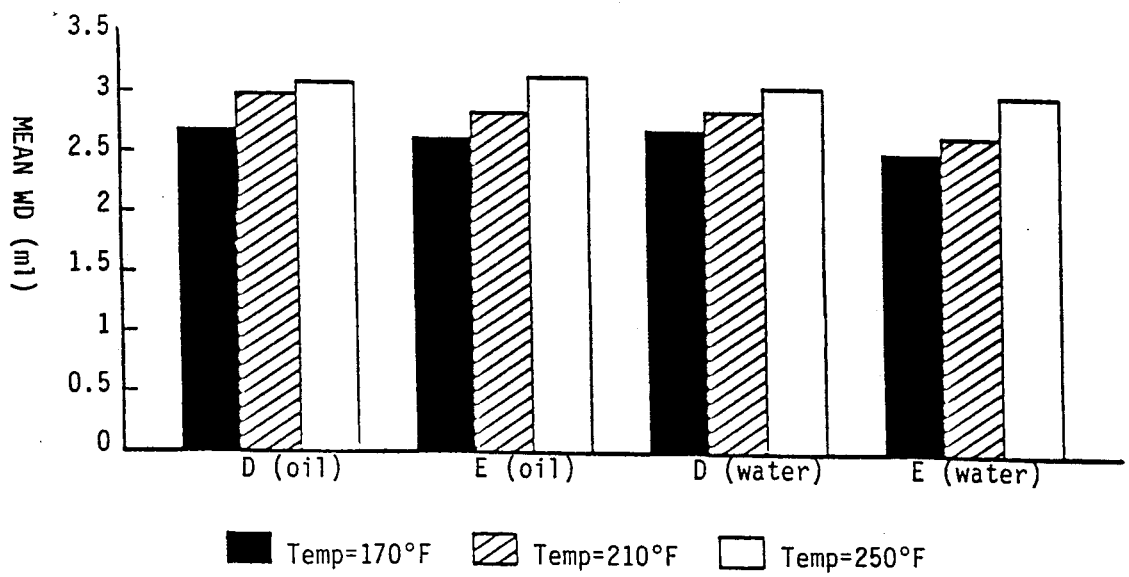
FIG. 6 is a bar graph of mean water drop versus addition point for Emulsion 2 at varying temperature.
Figure 7:
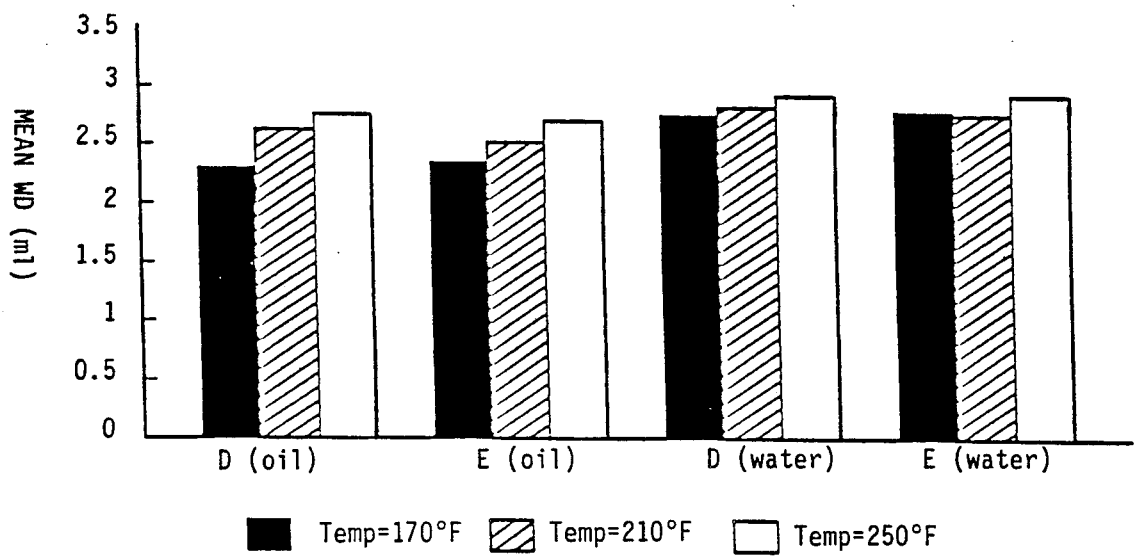
FIG. 7 is a bar graph of mean water drop versus addition point for Emulsion 3 at varying temperature.
Figure 8:
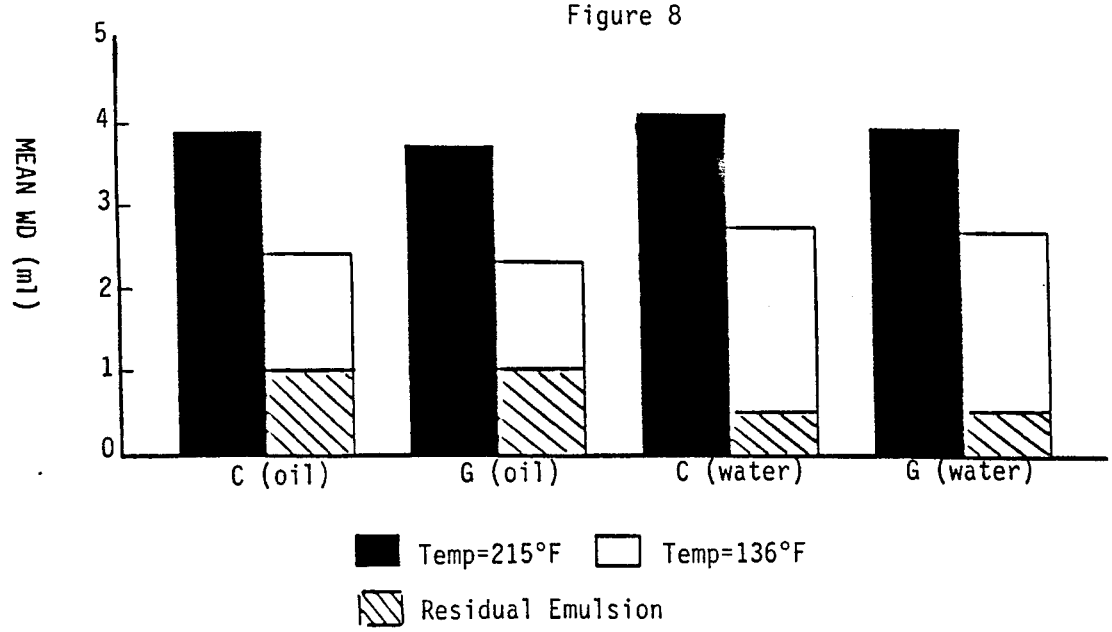
FIG. 8 is a bar graph of mean water drop versus addition point for Emulsion 4 at varying temperature.
Figure 9:
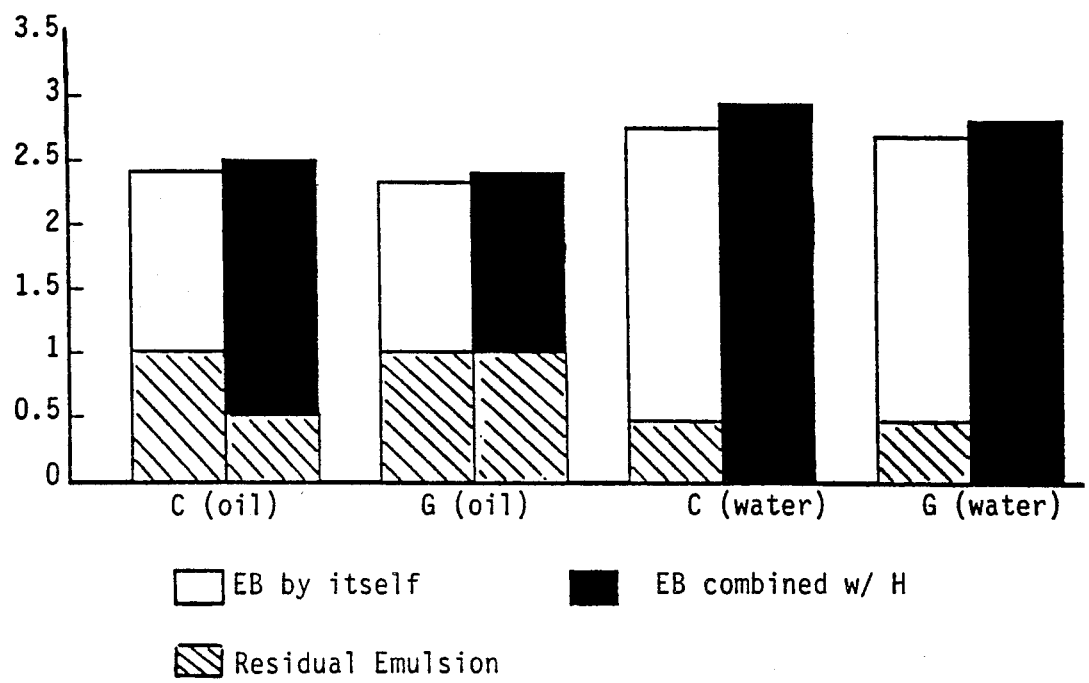
FIG. 9 is a bar graph of mean water drop versus addition point for Emulsion 4.
Figure 10:
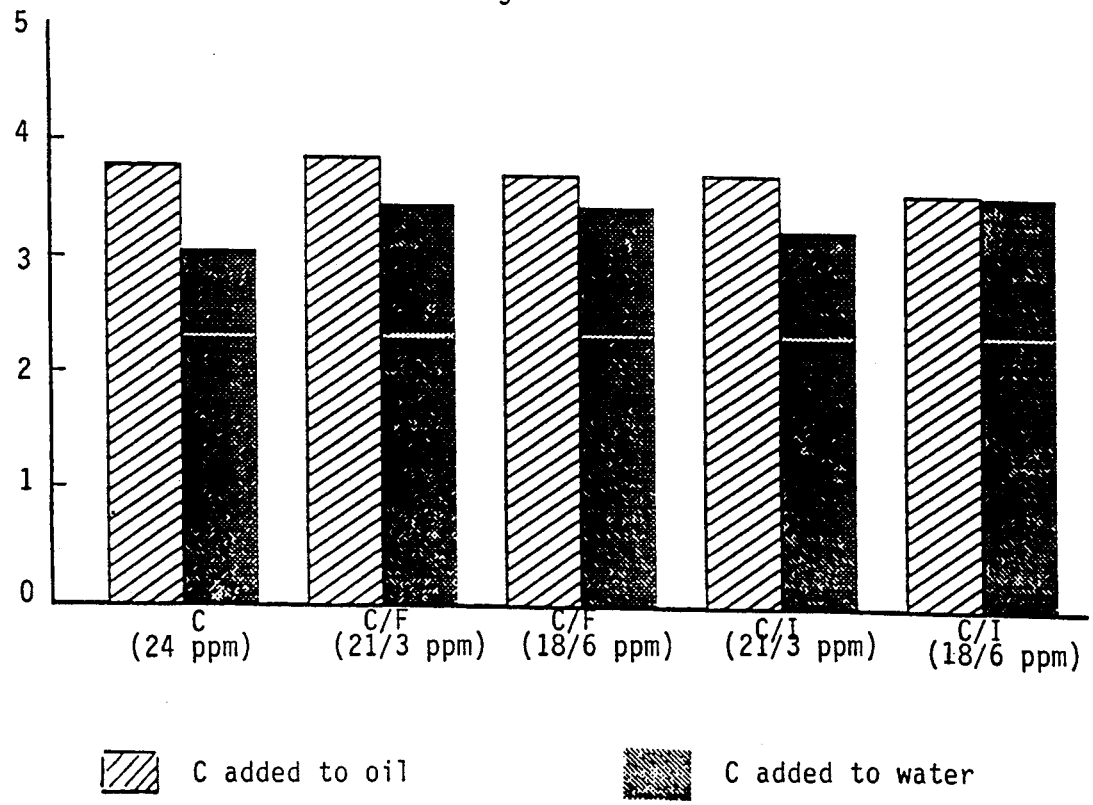
FIG. 10 is a bar graph of mean water drop versus addition point for Emulsion 5.

FIGS. 1-10 summarize the testing of the crude oil described in Table 1 with the demulsifiers described in Table 2. FIGS. 1, 2 and 3 show water drop versus time for different treatment levels of Demulsifier A for Emulsion 1. FIG. 4 shows mean water drop versus treatment level for varying addition points of demulsifiers A and B for Emulsion 1. FIG. 5 shows mean drop versus addition point for Demulsifiers A, A plus C for Emulsion 1. FIG. 6 and 7 shows mean water drop for varying addition points and temperatures of Demulsifiers D and E for Emulsion 2. FIG. 8 shows mean water drop for varying addition points and temperatures of Demulsifiers C and G for Emulsion 4. FIG. 9 shows mean water drop of Demulsifiers C and G alone and in combination with H for Emulsion 4. FIG. 10 shows mean water drop at varying addition points for Demulsifiers C, F, I and combinations thereof at varying treatment ratios for Emulsion 5.

While this invention has been described with respect to particular embodiments thereof, it is apparent that numerous other forms and modifications will be obvious to those skilled in the art. The appended claims generally should be construed to cover all such obvious forms and modifications which are within the true spirit and scope of the present invention.

I claim:

1. A method of resolving a water-in-oil emulsion in a crude oil desalting system wherein the crude oil forms a reverse (oil-in-water) emulsion at a temperature of 90°–150° C., which comprises mixing an oil-based demulsifier with the wash water feed of the desalting system at said temperature, thereafter contacting, in the desalter system, a crude oil feedstream with the wash water containing said demulsifier and thereafter separating the crude oil from the wash water wherein said demulsifier is selected from the group consisting of alkoxylates of the following: alkylphenols, alkylamines, alkylols and/or polyols with or without cross-linking with aldehydes, di- or multifunctional acids, epoxides, and isocyanates.

2. The method of claim 1 wherein from about 1 to about 200 parts per million of said demulsifier based on crude oil is mixed with said wash water.

3. The method of claim 2 wherein from about 5 to about 25 parts per million of said demulsifier based on crude oil is mixed with said wash water.

* * * * *